June 16, 1925.  1,542,463
W. H. LYREMAN ET AL
INTERNAL COMBUSTION ENGINE
Filed Aug. 2, 1922  5 Sheets-Sheet 3
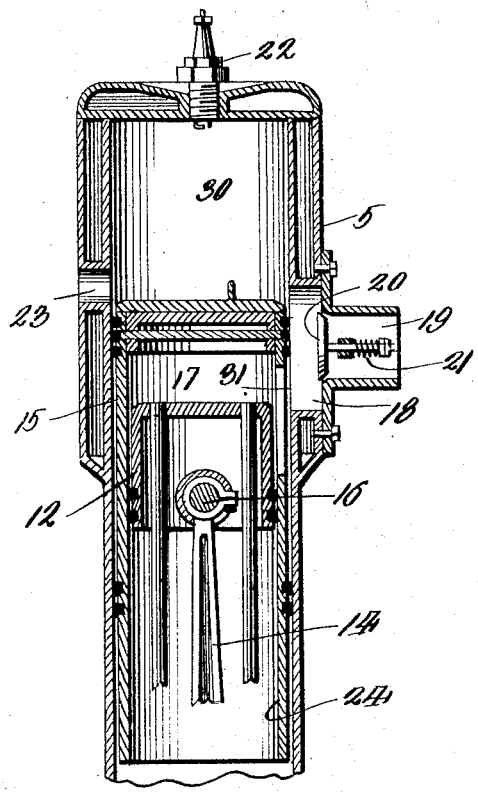
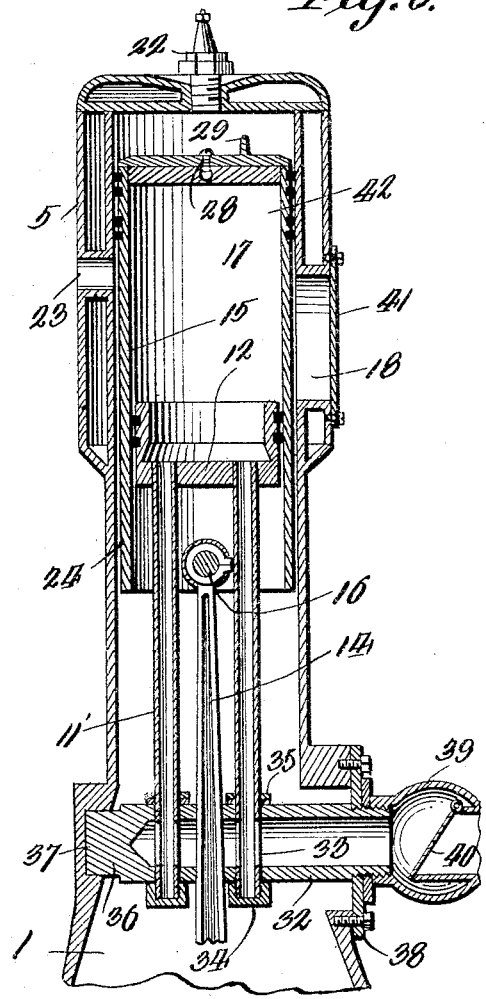
WITNESSES
Inventor
WALTER H. LYREMAN
GUY A. AMIDON
By
Attorney

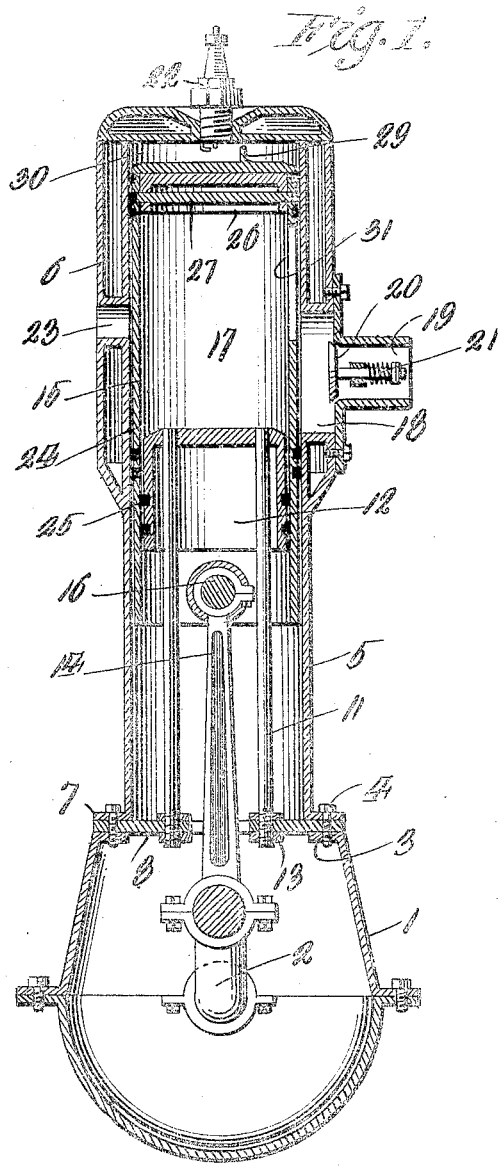
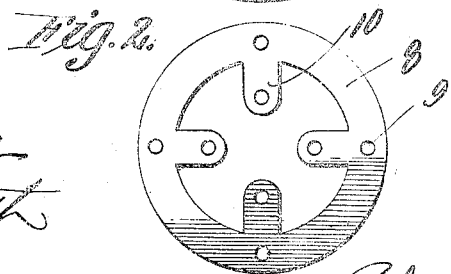

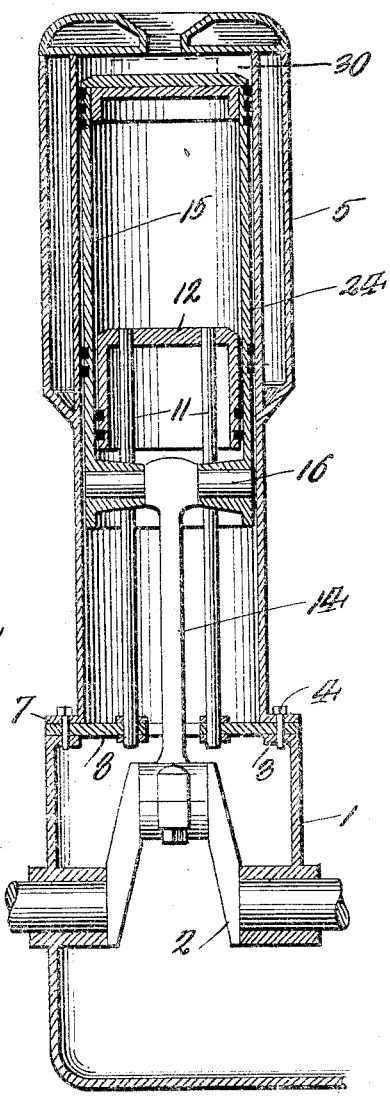

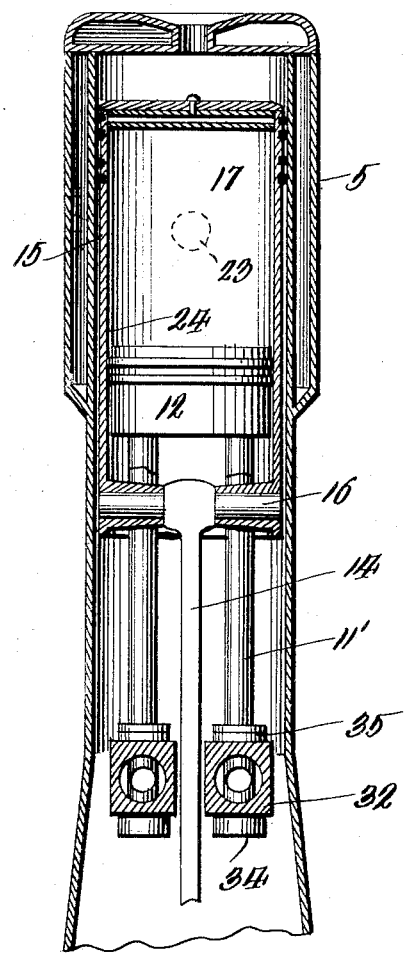
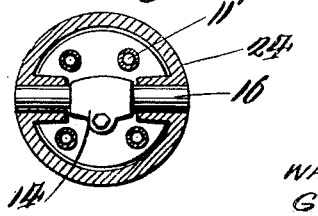

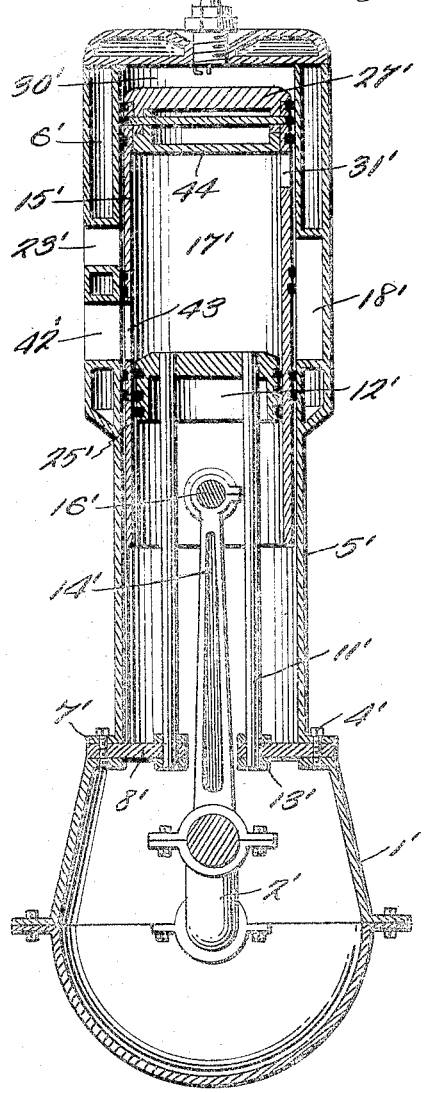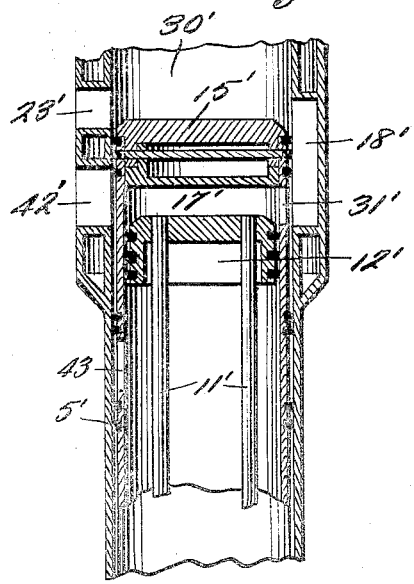

Patented June 16, 1925.

1,542,463

UNITED STATES PATENT OFFICE.

WALTER H. LYREMAN, OF LOS ANGELES, CALIFORNIA, AND GUY A. AMIDON, OF BRIGHTON, COLORADO.

INTERNAL-COMBUSTION ENGINE.

Application filed August 2, 1922. Serial No. 579,305.

*To all whom it may concern:*

Be it known that we, WALTER H. LYREMAN and GUY A. AMIDON, citizens of the United States, residing at Los Angeles, California, and Brighton, county of Adams, and State of Colorado, have invented certain new and useful Improvements in Internal-Combustion Engines, of which the following is a specification.

This invention relates to new and useful improvements in two cycle internal combustion engines and has for its primary object the provision of means for producing primary compression of the charge and to eliminate the objectionable methods of crank case compression conventionally used by various types of two cycle combustion engines.

Another important object of the invention resides in the provision of means for securing a greater volume of intake gas for initial compression and producing a greater compression in the primary or initial compressing operation of the engine.

A further object of the invention resides in the arrangement of the various parts of the engine to include a combustion chamber and a primary compression chamber together with means whereby the primarily compressed charge is rapidly transferred from the primary compression chamber to the combustion chamber. The arrangement also renders it possible to make both primary and final compression in each individual cylinder independently of all others whereby this type of two cycle internal combustion motor can be built in multiple cylinder blocks having any number of cylinders regardless of whether an odd or even number of cylinders is employed, thereby obviating the necessity of building motors in pair of cylinders in the conventional manner.

A still further object of the invention resides in the provision of an arrangement whereby the piston works against heavier compression on the power stroke so as to provide a cushioning effect and reduce bounding action of the piston, thus reducing bounding and vibration, and lending toward a smoother running motor.

Another object of the invention resides in the provision of an arrangement whereby the primary compression chamber is constantly in communication with the intake conduit of the engine so that a charge will be drawn into the said compression chamber during the entire up stroke of the power piston so that the maximum amount of charge will be drawn into the primary compression chamber and greater compression of the charge will be effected.

Another object of the invention resides in the provision of an internal combustion engine of the above character which embodies the simplest possible arrangement with a minimum number of parts.

Other objects and advantages of the invention will become apparent during the course of the following description.

In the accompanying drawings forming a part of the description and wherein like numerals are employed to designate like parts throughout the several views, Figure 1 is a vertical transverse section of the preferred type of the motor, Figure 2 is a plan of the support for the stationary piston, Figure 3 is a longitudinal section of the motor taken at right angles to the section of Fig. 1, Figure 4 is a horizontal section through the same, Figure 5 is a transverse section of the motor taken on the same line as the section shown in Fig. 1, showing the power piston near the end of its power stroke.

Fig. 6 is a section through a modification of Fig. 1.

Figure 7 is a similar view of the same taken in a plane at right angles to the section shown in Fig. 6, Figure 8 is a horizontal section through the cylinder and means for supporting the stationary piston.

Figure 9 is a longitudinal vertical section through another modification of the invention wherein valves are required, and Figure 10 is a fragmentary longitudinal vertical section of the same showing the moving power piston near the end of its stroke for transferring the primarily compressed charge from the moving piston to the cylinder above the same.

Referring to the Figs. 1, 2, 3, 4 and 5 wherein the preferred embodiment of the invention is shown, the numeral 1 designates a crank case of any suitable construction through which is journaled a crank shaft 2 in a conventional manner. The upper edges of the crank case are provided with inwardly extending horizontal flanges 3 suitably apertured for the passage of bolts 4. A cylinder 5 which may be water jacketed as at 6 in the conventional manner is supported on the crank case and for this purpose has its lower open end provided with an outwardly extending flange 7 provided with apertures adapted to align with those in the flange of the crank case. A support for a stationary piston within the cylinder consists of a ring 8 which is equipped with apertures 9 adapted to align with the aligning apertures in the flanges of the cylinder and crank case. This ring is adapted to be disposed between the flanges of the cylinder and crank case as shown in Fig. 1 and held in position by the bolts 4. This ring is provided with a plurality of radially extending arms 10 which extend inwardly toward the center of the ring and are apertured at their outer ends for the reception of the threaded lower ends of rods 11 provided for supporting the stationary piston 12. A pair of lock nuts 13 are positioned on the lower threaded end of each rod 11, one being engaged with the top of its supporting arm 10 while the other is engaged with the bottom or lower face of said arm whereby the rods 11 are rigidly supported by the plate 8 to extend vertically within the cylinder 5 and in such relationship that a connecting rod 14 which is connected to the crank shaft 2, and to a power piston 15 will have free unrestricted movement. The rods are also arranged so as to be avoided by the wrist pin and its journals formed on the power piston.

It will be noted that the stationary piston 12 is arranged about midway of the cylinder and in fact provides a bottom for the cylinder and one wall of a compression chamber 17 disposed between the stationary piston and the head of the power piston 15.

A wall of the cylinder 5 adjacent the stationary piston 12, and directly above the same is provided with a laterally arranged by pass 18 which is adapted to be connected to an intake conduit 19 to communicate therewith. The opening which communicates with the intake is provided with a valve seat for the reception of an automatic valve 20 which is normally held closed by a coil spring 21 mounted on the stem of the valve 20. It will of course be understood that the gas or charge intake conduit 19 is connected with any conventional form of carburetor means.

The top of the cylinder 5 is provided with a spark plug opening for the reception of a spark plug 22 and the side of the cylinder opposite the by pass 18 is provided with an exhaust port 23 which is arranged opposite the relative upper portion of the by pass as shown. The power piston 15 comprises a head and a relatively long skirted portion 24 which has a sliding fit in the bore of the cylinder and is of such a size to snugly receive therein the stationary piston 12. The skirted portion of the power piston is therefore received between the cylinder and the stationary piston, and it will be noted that the lower end of the skirt is always disposed below the stationary piston. Both pistons are provided with piston rings 25 of the conventional type. The piston head of the power piston 15 is made removable by providing the same with a depending annular flange 26 which fits down within the top of the skirt 24 and is provided with apertures to align with apertures in the upper portion of the skirt so that a removable bolt 27 can be passed through the skirt and depending flange for holding the head in proper relationship to the skirt. It will be noted that the bolt openings in the skirt are provided in the bottom of one of the piston ring grooves so that after the bolt has been inserted the piston ring can be clamped in the groove to prevent accidental displacement of the bolt. If preferred, the bolt can be held in place by a screw 28 as shown in Figs. 6 and 7 extended through the piston head for abutment with the bolt.

The top of the head is provided with an upstanding deflector rib 29 situated adjacent the intake 19 of the cylinder so that the charge in entering the chamber between the top of the piston head and the top of the cylinder which I will term the combustion chamber 30 will be directed upwardly of the chamber to chase the burned charge from the combustion chamber into and through the exhaust port 23. The top of the cylinder is removable so as to facilitate removal and repair of the piston and interior of the cylinder.

In order to admit a charge from the by pass 18 into the primary compression chamber 17 and to permit the charge after being primarily compressed in the chamber 17 to pass around the piston to the combustion chamber 30, the skirt of the power piston is provided with a relatively long slot 31 in the side thereof adjacent the by pass 18. This slot is of such a length that it always communicates with the by pass 18 regardless of its position in the cylinder, and in other words, the primary compression chamber is constantly in communication with the intake.

The operation of the engine is as follows: Assuming the power piston to be in the position shown in Fig. 5, with its port 31 in communication with the by pass 18 and the crank shaft is turned over, the power piston 15 will move upwardly of the cylinder thereby creating a suction in the chamber 17 so that the automatic valve 20 controlling the intake will be lifted from its seat to admit a charge from the carburetor to the by pass 18 and thence through the slot 31 into the primary compression chamber 17. As the slot 31 in the power piston is in communication with the by pass 18 in all positions, the charge will be continually drawn into the compression chamber 17, during the entire up stroke of the power piston. Consequently, a charge having the maximum volume will be admitted into the primary compression chamber, and upon the down stroke, or power stroke of the piston 15, this charge will be primarily compressed in chamber 17 since the valve 20 will immediately close upon the beginning of the down stroke. This charge will continue to be compressed until the top of the piston head of the power piston reaches a point below the top of the by pass 18 and the exhaust port 23, at which time the compressed charge will pass around the piston through the by pass 18 and above the same to enter the combustion chamber 30. Any burnt charge in the combustion chamber will be forced out through the exhaust port 23. As the power piston moves upwardly again on its compression stroke, the primarily compressed charge now in combustion chamber 30 will be compressed a second time, and simultaneously therewith, a fresh charge will be drawn from the intake and by pass into the primary compression chamber 17. As the power piston reaches the height of its compression stroke, a conventional timing mechanism, not shown herein, will cause a spark at the spark plug to ignite the highly compressed charge. Upon explosion of the charge, the power piston 15 will be driven downwardly with great force and this piston will compress the charge disposed in the primary compression chamber 17. Due to the fact that the charge occupies the space beneath the power piston head it will be obvious that a cushioning of the power piston takes place. When the power piston reaches the lower end of its power stroke, it will be seen that the port 31 will still be in communication with the by pass so that the primarily compressed charge will be promptly transferred around the piston head into the combustion chamber 30 as soon as the piston head moves below the upper end of the by pass 18. In the modified form of the invention shown in Figs. 6, 7 and 8, the charge is not admitted into the by pass 18 directly from the carburetor, but is transferred from the carburetor to the primary compression chamber 17 through the stationary piston 12, and the supports 11' therefor. The supports 11' are upstanding tubes arranged so as not to interfere with the movement of the connecting rod, wrist pin and its connection with the skirt 24 of the power piston. In the present instance, four tubular supports 11' are shown and are arranged in two sets, each set consisting of a pair of tubes. The lower ends of each pair of tubes are extended diametrically through a chambered member 32 supported within the crank case 1. The portions of the tubes which are arranged within the chambered member are apertured as at 33 and this relationship of the tubes and chambered member 32 is maintained by screwing caps 34 on the lower ends of the tubes for abutment with the bottom of the chambered member 32, while a pair of lock nuts 35 are screwed onto each tube to abut the relative upper portion of the chambered member.

The end of each chambered member 32 is reduced as at 36 to be received in a suitable socket 37 provided in the wall of the crank case, and the opposite end of each chambered member is reduced and screw threaded to extend through a removable plate 38 disposed over an opening in the crank case as shown clearly in Fig. 6. A valve chamber 39 is attached to this threaded end of each chambered member and is provided therein with an inwardly opening pivoted valve 40 which opens during the compression stroke of the power piston. The valve chamber 39 is communicated with a carburetor in any conventional manner.

The by pass 18 in the present modified form of the invention is not provided with the automatic valve 20 since the valve 40 takes its place and the by pass is suitably closed by a removable plate 41. Other than the construction of the means for conveying the charge to the primary compression chamber, the modified form of the invention is the same as the preferred form heretofore disclosed, with the exception of the fact that the skirt 24 of the power piston is provided with a relatively small port 42, but this port can be made as long as the slot 31 in the preferred embodiment so as to be in communication with the by pass in all positions of the power piston. In the operation of this modification of the invention, when the power piston moves upwardly on its compression stroke, the valve 40 automatically opens to admit into the chambered members 32 a charge from the carburetor. As the power piston moves further upwardly in the cylinder the charge is transferred through the tubes 11' into the primary compression chamber 17 so that when the power piston moves downwardly on its power stroke, the charge in the primary compression chamber will be compressed and the valve 40 will be automatically closed by back pressure of the charge thereon. As soon as the head of the power piston moves to a point below the top of the by pass 18 the compressed charge will be transferred through the port 42 into by pass 18 and thence around and over the top of the piston into the combustion chamber 30. The baffle 29 prevents the charge from moving directly toward the exhaust port 23 and causes the charge to move upwardly in the combustion chamber to chase out the burnt charge. Upon the second compression stroke of the power piston, the charge which has been transferred into the combustion chamber will be compressed a second time, during which operation, a new charge will be drawn into the primary compression chamber 17 by way of tubes 11'. As the piston reaches the limit of its compression stroke, the charge will be ignited by the spark plug 22 and the power piston will be forced downwardly on its power stroke, whereby the crank shaft will be thrown over at the same time that the charge in the primary compression chamber is being compressed. It will be obvious in both modifications, that any number of cylinders can be used in a motor, and since each cylinder is a unit in itself, as many cylinders can be added to the motor as desired, regardless of whether even or uneven number is added.

In the modified form of invention shown in Figures 9 and 10 and which requires no valves, consists of parts marked with numerals containing prime coefficient which are the same as parts in Figure 1 marked with corresponding numerals without prime coefficient. However, the differences between the modification shown in Figures 9 and 10, and Figure 1, consists in making the port 31' considerably smaller than port 31 in Figure 1 and arranging the same adjacent the top of the power piston. Another difference is that the cylinder block is provided with an intake port 42' and immediately below the exhaust port 23' a port 43 of corresponding size is provided in the skirt of piston 15' at a point about midway of its length and on the side of the piston opposite that in which the port 31' is placed. In order to increase the amount of gas transferred from the primary compression chamber 17' to the by pass 18', a flanged disk 44 is placed up in top of the power piston 15' and the flange of the disk is apertured to receive portions of the bolt 28 which secures the disk to the piston so that its lower face is flush with the top edge of the port 31'. By the shortening of the upper end of the interior of power piston, it will be obvious that the compressed gases will not have any tendency to hang in the pocket which is covered by the disk 44.

The location of the port 43 in the power piston may be described in reference to the position of the power piston when the gas is admitted through intake port 42' into the power piston. The charge to be exploded is admitted into the primary compression chamber 17' when the crank of the power piston is about sixty degrees in advance of upper dead center and the gas continues to rush into the primary compression chamber until this crank is approximately sixty degrees past the upper dead center and on the downward stroke of the power piston. Due to the arrangement of the port 43 in the power piston, it will be seen that on the upstroke of this piston, a partial vacuum will be created in the primary compression chamber before the port 43 comes into alignment with the intake port 42' of the engine block.

The operation of this modified form of engine is as follows:

Upon upstroke of the power piston 15', a partial vacuum is created in the primary compression chamber 17', and when the port 43 of the power piston begins to register with the intake port 42 in the cylinder, gas will be sucked into the primary compression chamber and will continue to be drawn in until the crank of the power piston passes the sixty degrees mark past upper dead center. If a charge has been compressed between the top of the cylinder and the top of the power piston, the spark plug 22' will explode the charge, the force of which will move the power piston downwardly to primarily compress the charge sucked in on the upstroke of the piston while the exploded gas will pass out through the exhaust port 23' as soon as the top of the power piston moves below the top edge of this exhaust port 23''. Before the top of the piston reaches the top of port, the port 31' in the power piston will have registered with the by pass 18' to permit the compressed gas in the primary compression chamber 17' to enter the by pass and be transferred over the top of the piston as soon as it descends below the edge of the by pass port. The power piston moves further downwardly, the gas in the primary compression chamber is further compressed and is forced out into the by pass 18' and thence around the top of the piston, it being understood that exhaust port 23' is closed by the piston at the time that all of the exploded gas has been discharged from the combustion chamber 30'.

Having thus fully described our invention what we claim is:—

1. An internal combustion engine comprising a cylinder having a combustion chamber in one end thereof, a reciprocating piston within the cylinder, a second piston forming with the first piston a primary compression chamber, an unobstructed longitudinal elongated by pass in the cylinder at one side thereof, an opening throughout its entire length into the interior of the cylinder, and situated approximately intermediate the ends of the reciprocating piston when the same is on upper dead center, said cylinder having an exhaust port in the wall opposite the by pass, and also having an intake port therein slightly below the exhaust port, said reciprocating piston having a relatively long skirt which extends below the by pass and inlet port when said piston is arranged at upper dead center, said piston skirt having a port in its upper end on the by pass side of the cylinder and also having an inlet port adjacent its lower end and on the exhaust side of the cylinder, said inlet port of the piston being in alignment with the inlet port of the cylinder when the reciprocating piston is arranged at upper dead center, and said port communicating while the reciprocating piston is arranged in proximity to upper dead center position.

2. An internal combustion engine comprising a crank case, a cylinder positioned thereon, a plate clamped between said crank case and cylinder and having a plurality of radiating arms, an upstanding rod carried by each arm and extending into the cylinder, a stationary piston head mounted at the upper ends of said rod, a reciprocating piston mounted in said cylinder and having a skirt portion adapted to slide between said stationary piston head and the cylinder walls, a connecting rod depending from the reciprocating piston and operating between said rods, said cylinder having a by pass, and inlet and outlet ports, and said reciprocating piston having a pair of ports arranged at opposite sides of the piston.

In testimony whereof we affix our signatures in presence of two witnesses.

WALTER H. LYREMAN.
GUY A. AMIDON.

Witnesses:
Mrs. Chas. Newbill,
Chas. Newbill.